Inventors
Clarence W. Kamm
Carl W. Sisco
Charles A. Lind
Attorney

Patented Apr. 15, 1952

2,593,313

UNITED STATES PATENT OFFICE 2,593,313

APPARATUS FOR DETECTING WATER VAPOR IN GASES

Clarence W. Kamm and Carl W. Sisco, Toledo, Ohio, assignors to Surface Combustion Corporation, Toledo, Ohio, a corporation of Ohio Application January 29, 1947, Serial No. 725,020

8 Claims. (Cl. 73—17)

The present invention has for its object to provide a dew point indicating apparatus which shall be well adapted for ascertaining the water-vapor dew point of a gas which because of its relatively low water vapor content may require to be chilled to a temperature ranging anywhere from say 30° F. to minus 40° F. and lower before the vapor will condense on a correspondingly chilled light-reflecting surface such as a mirror. It has been found that as the chilling temperature decreases the greater is the difficulty of obtaining a true water-vapor dew-point reading primarily because at the lower temperatures other condensibles (as, for example, oil vapor picked up by the gas on its way through oil-lubricated pumps and other conduit means) whose presence may not be troublesome at the higher temperatures, tend, at the lower temperatures, to cause trouble by condensing on the mirror with resultant change in the normal reflectivity of the mirror. One of the more special objects of the invention is to overcome this particular difficulty in a way to enhance the utility of the instrument in the lower temperature ranges. Other related objects will more fully appear hereinafter.

For a consideration of what we consider to be novel and our invention attention is directed to the following specification and the claims appended thereto.

In the accompanying drawings.

Figure 1:
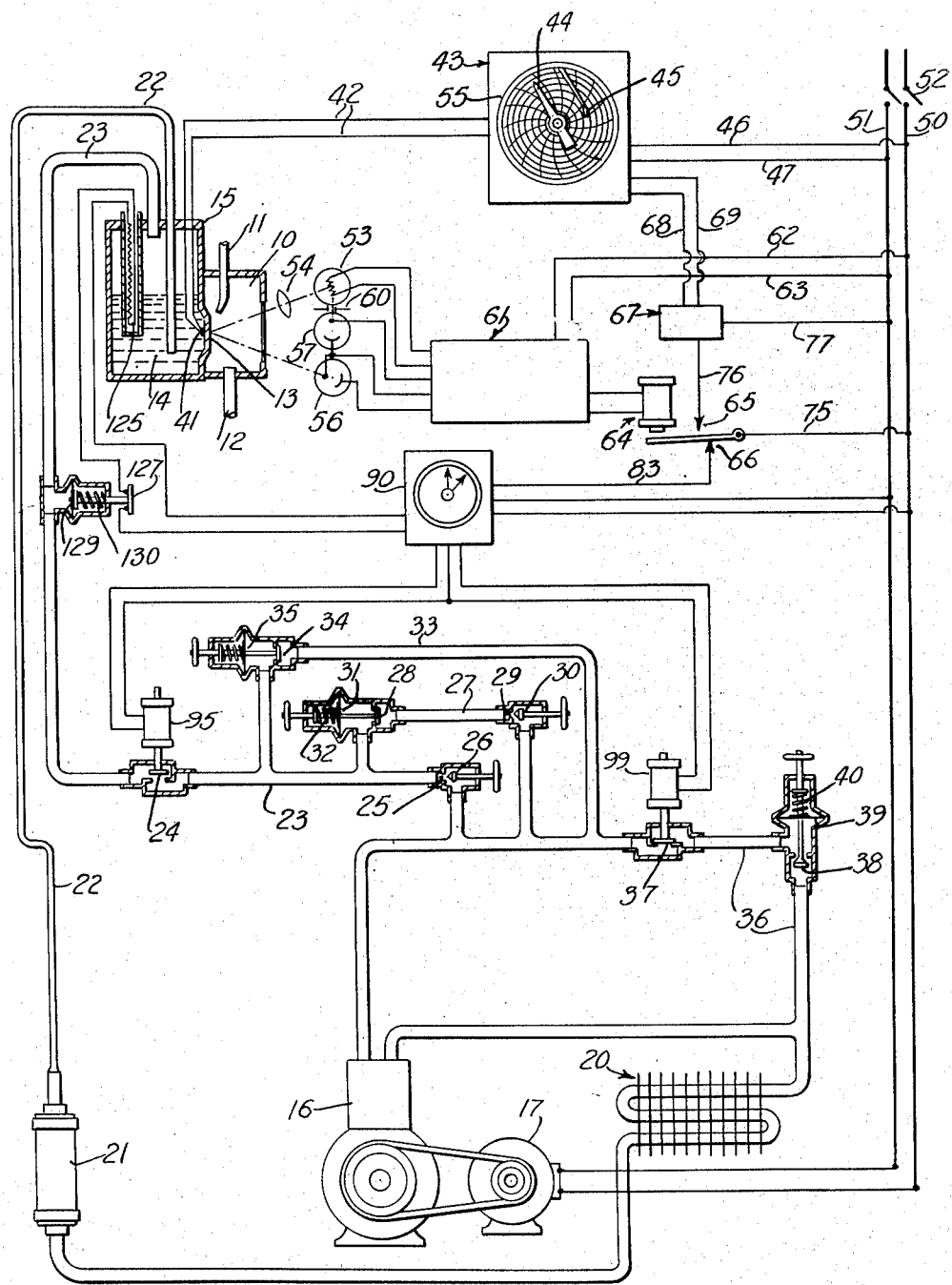
Fig. 1 is a more or less diagrammatic view of apparatus embodying the present invention.

The gas to be tested for water vapor is conducted to a testing chamber 10 by a small feed pipe 11 and is vented therefrom through a vent pipe 12. The testing chamber contains a mirror 13 which is exposed to said gas and which is adapted to be chilled by a refrigerant 14 in an evaporating vessel 15. The evaporating vessel comprises part of a refrigeration system which includes a compressor 16, an electric motor 17 for driving the compressor, and the usual condenser 20, filter 21 and capillary feed tube 22 whose outlet is immersed in the body of refrigerant 14 in the evaporating vessel. The suction line between the evaporating vessel and the compressor is indicated at 23 and includes a shut-off valve 24 and a flow-restricting orifice 25 whose effective area depends on the setting of a needle valve 26.

In order to detect the merest trace of water vapor in the carrier gas the refrigeration system must be capable of chilling the mirror to low temperatures as low as minus 40° F. and lower. It is desirable and in fact necessary if high accuracy of dew point readings is to be obtained to chill the mirror at a substantially constant rate but the properties of available refrigerants and the rate of heat transmission through the walls of the evaporating vessel 15 are ordinarily such that for a given setting of the needle valve 26 of the primary orifice 25 in the suction line 23 between the compressor 16 and the evaporating vessel, the rate of temperature change decreases quite rapidly as the temperature decreases. To solve this difficulty the present invention provides a system for successively decreasing the absolute pressure applied to the evaporating vessel whereby to accelerate the evaporating of the refrigerant therein, and thus maintain the cooling rate substantially constant. To permit a greater decrease in absolute pressure than the particular setting of the needle valve 26 permits, there is provided a first by-pass line 27 around the primary flow-restricting orifice 25, this line having a normally closed valve 28 and a flow-restricting orifice 29 whose effective cross sectional area depends on the setting of a needle valve 30. The opening and closing of the shut-off valve 28 are controlled by a diaphragm 31 which is responsive (through the pipe 23) to the pressure prevailing in the evaporating vessel 15, the diaphragm being so adjusted by a spring 32 that when the prevailing pressure in said vessel decreases to a value corresponding to some preselected temperature, as 20° F., the valve 28 will open and thus permit substantially more of the suction capacity of the compressor 16 to be effective in the evaporating vessel to increase the rate of evaporation of the refrigerant therein. To permit still greater decrease in the absolute pressure than is permitted by the by-pass line 27 there is provided a second by-pass line 33 around the orifice 25, this line having a normally closed valve 34 whose opening and closing are controlled by a diaphragm 35 which is responsive (through the pipe 23) to the absolute pressure prevailing in said vessel, the diaphragm being so adjusted (by a spring pressing thereon) that when said pressure decreases to a value corresponding to minus 20° F. (or thereabouts) the valve 34 will open thereby permitting the full suction capacity of the compressor to be effective in the evaporating vessel to reduce the temperature, say, to minus 40° F.

To avoid the necessity of stopping the compressor 16 every time the main valve 24 in the suction line 23 is closed (to permit reheating of the mirror 13 after a chilling operation), the high and low pressure sides of the compressor are interconnected through a pipe line 36 having a shut-off valve 37 and also having a throttling valve 38 for preventing the pressure at the low pressure side of the compressor from decreasing below atmospheric pressure (to avoid drawing air into the system), the throttling valve comprising the usual diaphragm 39 and a spring 40 for adjusting its setting.

For ascertaining the temperature of the mirror 13, a thermocouple 41 is secured thereto as to the back side thereof and is connected by leads 42 to a recording potentiometer 43. The potentiometer is preferably of a self-balancing type employing a potentiometer circuit that is automatically balanced by an electrical motor controlled according to the unbalance between the thermocouple voltage and the potentiometer voltage. The adjustment of the potentiometer circuit as a measure of temperature is indicated by a pointer 44 and the temperature indication is recorded by a pen 45 whose writing point moves in a generally radial direction across the face of a slowly rotating paper chart. Electrical power for operating the potentiometer is obtained through leads 46 and 47 from a power line 50—51 having a disconnect switch 52.

Condensate on the mirror 13 is detected by change in its reflectance. Light from a light source 53 passes through a condensing lens 54 and through a window of the testing chamber 10 and is reflected from the mirror to a photoelectric cell 56. The presence of condensed vapor on the mirror, by decreasing the light reflectance of the mirror, decreases the light received by the photocell 56 whereupon a measurable electrical effect is produced. Since the photocell 56 cannot distinguish between a change in reflectance of the mirror and a change in light output of the light source 53, a balancing photocell 57 which views the light source 53 through an aperture in a screen 60 is included to cancel out the effect of changes in light output of the light source 53. The photocells 56 and 57 are connected to an amplifier 61 which is energized through leads 62 and 63. As the mirror 13 is cooled and vapor in the gas passing through the testing chamber 10 condenses thereon, the light transmitted to the photocell 56 decreases and the amplifier 61 thereupon energizes a relay 64 having a normally open contact 65 and a normally closed contact 66.

When the normally open contact 65 is closed it energizes a time-delay relay 67 whose function is to control the making and breaking of a circuit 68 and 69 which when closed permits a balancing motor 70 of the recording potentiometer 43 to balance the potentiometer circuit to the temperature then existing at the thermocouple 41 associated with the mirror 13, it being understood that the circuit 68 and 69 is energized through a thermocouple amplifier 71. The time-delay relay 67 controls the circuit 68 and 69 through a normally open contact 72 and a normally closed contact 73, the arrangement being such that when the time-delay relay is first energized, the normally open contact 72 closes and then after a predetermined time interval the normally closed contact 73 opens. The time-setting of the time-delay relay 67 is adjusted so that under ordinary conditions the potentiometer has only sufficient time, say, one-forth of a second, to reach a balance and whereupon it is paralyzed immediately thereafter. This arrangement of paralyzing the balancing circuit of the potentiometer except for a brief time interval immediately following an operation of the amplifier 61 permits the pointer 44 and the pen 45 to continuously indicate the last observed fogging temperature of the mirror and then quickly step to a new temperature should a change in fogging temperature occur during the next cycle of operation.

The time-delay relay 67 will ordinarily comprise an operating coil 74 whose energizing circuit (when the contact 65 is closed) comprises the leads 75, 76 and 77. The movable elements of the contacts 72 and 73 are indicated at 78 and 79, respectively, and, as indicated at 80, they are electrically interconnected so that the contacts 72 and 73 are in series. The means for opening the switch element 79 comprises an axially movable rod 81 which at one end is connected to the movable element 82 of a pneumatic dash pot and which at its other end is connected to a tension spring 84 which in turn is connected to the normally open switch element 78 so that when the latter is moved to closed position the movement will stretch the spring. The rod 81 has a lost motion connection with the switch element 79 so that the latter is not moved by the rod until a finger or abutment 85 on the latter engages said element. The time required for the abutment 85 to reach the switch element 79 determines the time interval that must elapse before the normally closed contact 73 is opened following closing of the normally open contact 72 and this time interval is determined by the setting of a needle valve 83 of a bleeder orifice in the wall of the dash pot. When the spring 84 is no longer stretched following release of the first switch element 78, a spring 86 returns the movable element 82 of the dash pot to normal position and a retractible spring 87 thereupon returns the switch element 79 to its normal closed position.

The control valve 24 and the idling valve 37 of the refrigeration system are adapted to be operated in such sequence that when the valve 24 is open the valve 37 will be closed and vice versa. The opening and closing of these valves is controlled by a cycle timer 90 having a timing motor 91 adapted to be energized for a predetermined time (the timing period) during the time the normally closed contact 66 of the main relay 64 remains closed (as it does as long as the mirror 13 remains unfogged). During the timing period the main valve 24 is closed and the idling valve 37 is open, the main valve 24 being closed because there is an open contact 92 in a power circuit 93 and 94 to a solenoid 95 which when energized opens the main valve and the idling valve 37 being open because there is a closed contact 96 in the power circuit 93, 97 and 98 to a solenoid 99 which when energized opens the idling valve. The return lead from the solenoid 99 includes the lead 100 and the return lead from the solenoid 95 includes the leads 101 and 100.

Figure 2:
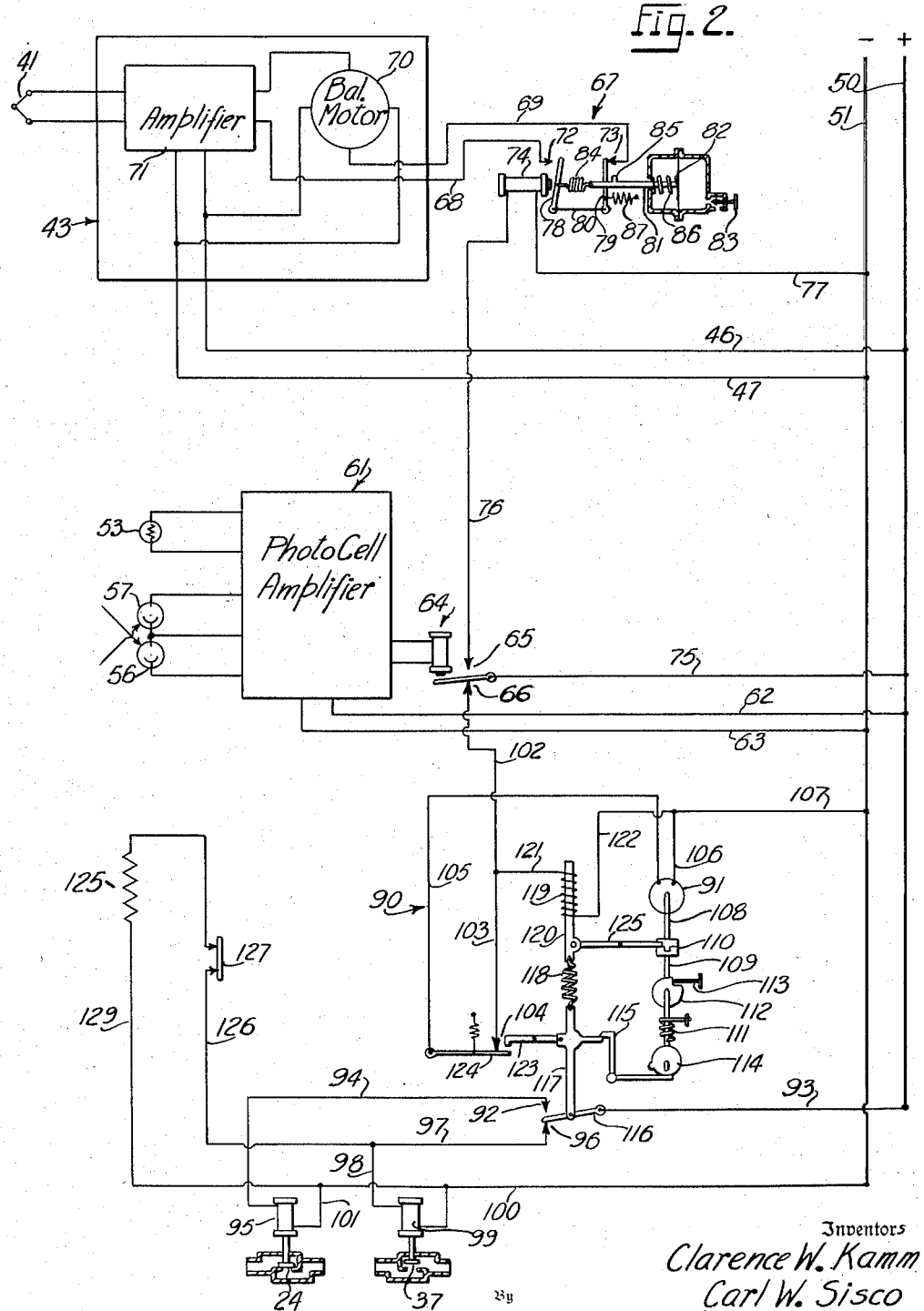
Fig. 2 is a more or less diagrammatic detailed view of the electrical system embodied in the improved apparatus.

The circuit for energizing the timing motor 91 when the contact 66 is closed includes the leads 75, 102 and 103, closed contact 104, and lead 105, and the return lead comprising leads 106 and 107. The output shaft of the timing motor is indicated at 108. The timing mechanism comprises a cam shaft 109 which is adapted to be driven by the shaft 108 when coupled thereto by clutch 110 but which when uncoupled is returned to zero or starting position by a spring 111, the zero position being that position at which a step on a cam 112 engages a fixed abutment 113. On the cam shaft there is another cam 114 whose function is to trip a latch 115 (shown in the form of a bell crank). When the latch is tripped the contact 96 (which controls the solenoid 99) is opened and the contact 92 (which controls the solenoid 95) is closed, the change being effected through a movable switch element 116 which is connected to an actuating bar 117 which was released for upward movement (as viewed in Fig. 2) when the latch 115 was tripped. The means for causing the bar 117 to move upwardly comprises a spring 118 which becomes tensioned when a coil 119 is energized to move its armature 120 in an upward direction. The coil 119 remains energized as long as the contact 66 of the main relay 64 remains closed, the energizing circuit for the coil then comprising leads 75, 102, 121, and return leads 122 and 107. When the bar 117 moves upwardly the power circuit of the timing motor 91 is interrupted at the contact 104 through force applied by the bar 117 through a lever 123 arranged to engage the movable element 124 of the contact 104 to open it. The clutch 110 between the motor shaft 108 and the cam shaft 109 is operated by the armature 120 of the coil 119 through a lever 125, the arrangement being such that the shafts are uncoupled when the coil is deenergized (by the opening of the contact 66 of the main relay 64). When the shafts become uncoupled the cam shaft 109 immediately returns to zero position to reset the timing mechanism so it may be ready for re-timing when the contact 66 again closes following unfogging of the mirror 13. (The timing period will ordinarily be from three to twelve minutes depending on the carrier gas being tested.) Upon coil 119 becoming de-energized the spring 118 will no longer be under tension and therefore the bar 117 is free to move downwardly to reopen the contact 92 and re-close the contact 96 whereby to re-close the main valve 24 and re-open the by-pass valve 37, respectively, of the refrigeration system to permit the mirror 13 to be re-warmed to dissipate the condensate thereon.

As previously mentioned, the carrier gas to be tested for water vapor is likely to contain traces of oil vapor which is condensible on the mirror at the low temperatures required to test for traces of water vapor. Generally speaking, water vapor tends to condense rather quickly when its condensing temperature has been reached whereas the oil vapor tends to condense relatively slowly and throughout a fairly wide temperature range. This difference in the physical characteristics of the two vapors permits the condensing temperature of the water vapor to be determined within very close limits even in the presence of a thin film of oil vapor condensate on the mirror by so adjusting the photocell amplifier 61 that it will require a substantially greater change in the light reflectance of the mirror than results from a relatively thin film of oil vapor condensate to initiate the actuation of the temperature recording mechanism. To this end the photocell amplifier 61 should be direct coupled so that it may respond to the slow changes in light as vapor condenses on the mirror 13 and it should be sufficiently stable electrically so that changes in voltage on the power line 50 and 51 or changes in ambient temperature do not produce false operation of the control relay 64. In addition, it is desirable that the amplifier 61 incorporate a trigger stage so that although the amplifier is very sensitive at certain threshold levels it will not produce chattering of the control relay 64 in the event that the photocell signal wavers above and below a mean value as the mean value approaches the threshold limits. By incorporating the trigger stage the control relay 64 is operated as soon as the photocell signal exceeds a predetermined value, but the relay is not released even though the signal immediately drops to a slightly lesser value. A material change in signal—a change that is substantially greater than the random fluctuations—is required to release the control relay 64. The power supply for the photocell amplifier 61 includes both a voltage regulating transformer and an electronic regulator so that the electrode voltages and filament temperatures are unaffected by changes in voltage on the lines 50 and 51.

Re-warming of the mirror 13 following a chilling operation is accelerated by an electric heating element 125 in the evaporating vessel 15. The power circuit for this heating element, when the contact 96 is closed, comprises the leads 93, 97, 126 and a normally closed contact 127, the return lead from said element comprising leads 129 and 100. The switch 127 is a safety switch for interrupting the circuit when the temperature of the refrigerant in the evaporating vessel 15 reaches a predetermined temperature as, for example, 60° F. The means for thus opening the switch comprises a diaphragm 129 which is responsive to the pressure prevailing in said vessel (through the pipe 23), the diaphragm being so adjusted by a spring 130 as to permit the switch to open when the prevailing pressure in said vessel corresponds to said predetermined temperature. When the water vapor condensate disappears from the mirror the photocell amplifier 61 will de-energize the relay 64 but, as previously explained, unless the cycle timer 90 permits the refrigeration system will not be actuated to rechill the mirror until a predetermined time interval has elapsed primarily to insure ample time for the evaporation of all previous condensate before the mirror is rechilled. At periodic intervals it may be found desirable to wipe the mirror by hand or otherwise to maintain it perfectly clean.

From the foregoing description it will be seen that the present invention provides a relatively simple and reliable apparatus for automatically determining the water vapor dew point of industrial gases that are likely to contain oil vapors and the like condensibles.

Having described the invention, we claim:

1. In apparatus for determining the dew point of a vapor in a gas, in combination, a reflecting surface exposed to the gas and in heat conductive connection with surroundings having temperatures above the range of dew point temperatures, a refrigeration system for chilling said reflecting surface, a light source for illuminating said surface, a photocell that receives light from said surface for detecting changes in its reflectivity when vapor condenses on said surface, means for measuring and indicating the temperature at which a change in the reflectivity of said surface occurs, an amplifier connected to the photocell, a timer that is connected to the amplifier and that is energized following a change in the reflectivity of said surface due to condensation of vapor on said surface, means for interrupting the refrigeration of said surface to allow it to assume the temperature of its surroundings, said interrupting means being energized through the timer, and the timing period of said timer being larger than the maximum time required to dispel condensed water vapor from the surface.

2. In apparatus for determining the dew point of a vapor in a gas, in combination, a reflecting surface exposed to the gas, a refrigeration system for chilling said reflecting surface, a light source for illuminating said surface, a photocell that receives light from said surface for detecting changes in its reflectivity when vapor condenses on said surface, means for measuring and indicating the temperature at which a change in reflectivity of said surface occurs, an amplifier connected to the photocell, a timer that is connected to the amplifier and that is arranged to close a control circuit for a period of time that is longer than the time required to dispel water vapor from the surface following a change in the reflectivity of said surface due to condensation of vapor on said surface, means in the refrigeration system for interrupting the rerigeration, said interrupting means being energized through the control circuit of the timer, and a heater energized through the timer and serving to heat the reflecting surface during the timing period of the timer to dispel condensate from said surface.

3. In apparatus for determining the dew point of a vapor in a gas, in combination, a closed vessel having a reflecting surface exposed to the gas, a refrigeration system of which the vessel serves as the evaporator, a light source for illuminating said surface, a photocell that receives light from said surface for detecting changes in its reflectivity when vapor condenses on said surface, means for measuring and indicating the temperature at which a change in reflectivity of said surface occurs, an amplifier connected to the photocell, a timer the starting circuit of which is connected to the amplifier and the output circuit of which is energized for a selected time interval following a change in the reflectivity of said surface due to condensation of vapor on said surface, means in the refrigeration system for interrupting the refrigeration, said interrupting means being energized through the output circuit of the timer, a heater mounted in the evaporator for heating said surface, said heater being energized through the output circuit of the timer, said selected time interval being longer than the time required for all traces of dew to disappear, and means for disconnecting the heater when a predetermined maximum pressure exists in the evaporator.

4. In apparatus for determining the dew point of a vapor in a gas, in combination, a reflecting surface exposed to the gas, means for alternately chilling and heating said surface alternately to induce vapor in said gas to condense thereon and evaporate therefrom, means for detecting a change in the reflectivity of said surface, automatic means including indication adjusting mechanism for measuring and indicating the temperature at which a change in the reflectivity of said surface occurs, means for energizing the indication adjusting mechanism of the automatic temperature measuring means, and a timer operatively connected to the amplifier and the energizing means for limiting the energizattion of the adjusting mechanism to a brief interval of time following the detection of a change in the reflectivity of said surface whereby said temperature indicating means indicates the previously determined dew point regardless of change of surface temperature until the next dew point determination.

5. In apparatus for determining the dew point of a vapor in a gas, in combination, a reflecting surface exposed to the gas, means for alternately chilling and heating the surface alternately to induce vapor in said gas to condense thereon and evaporate therefrom, means for detecting a change in the reflectivity of the surface, a motor driven mechanism for measuring and recording on a separately driven chart the temperature of said surface, and a time delay relay operatively connected to said detecting means and the control for the motor driven mechanism for energizing the motor for a brief time interval following the detection of a change in condensation of vapor, whereby the temperature measuring mechanism continuously records on the chart the previously determined dew point temperature until a different dew point temperature occurs on a succeeding determination.

6. In an apparatus for determining the dew point of a vapor in a gas, comprising a reflecting surface exposed to the gas, means for detecting a change in the reflectivity of said surface, and means for measuring and indicating the temperature of the surface at which a change in reflectivity occurs, in combination, an evaporator of which the surface constitutes a wall, a compressor connected to the evaporator for circulating refrigerant through and reducing the pressure in the evaporator, an adjustable restriction in a suction line between the evaporator and the compressor, and at least one by-pass including a valve controlled by the pressure in the evaporator and arranged to by-pass refrigerant flow past said adjustable restriction.

7. In apparatus for determining the dew point of a vapor in a gas, in combination, a surface exposed to the gas, temperature controlling means operable in a first condition for chilling said surface and in a second condition for heating said surface, said means having capacity to chill the surface to a temperature substantially below the dew point temperature of said vapor in the gas and to heat the surface to a temperature substantially above the dew point temperature of any condensable in the gas, a timer, means responsive to accumulation of condensate on said surface for actuating said timer, following a change in the reflectivity of the surface resulting from condensation of vapor on the surface, an operative connection from the timer to said temperature controlling means to cause said means to operate in its second condition while the timer is energized and return to its first condition when the timer is de-energized, said timer having a timing period that is long enough for the surface to be heated above the dew point of any condensables in the gas and for all condensed vapors to be evaporated from the surface.

8. In apparatus for determining the dew point of a vapor in a gas, in combination, a reflecting surface exposed to the gas, temperature controlling means operable in a first condition for chilling said surface and in a second condition for heating said surface, said means having capacity to chill the surface to a temperature substantially below the dew point temperature of said vapor in the gas and to heat the surface to a temperature substantially above the dew point temperature of any condensable in the gas, a light source for illuminating said surface, a photocell that receives light from said surface for detecting changes in reflectivity when said vapor condenses on said surface, means for measuring and indicating the temperature at which a change of reflectivity of the surface occurs, an amplifier connected to the photocell, a timer that is connected to the amplifier and that is energized following a change in the reflectivity of the surface resulting from condensation of vapor on the surface, an operative connection from the timer to said temperature controlling means to cause said means to operate in its second condition while the timer is energized and return to its first condition when the timer is de-energized, said timer having a timing period that is long enough for the surface to be heated above the dew point of any condensables and all condensed vapors to be evaporated from the surface.

CLARENCE W. KAMM.
CARL W. SISCO.

REFERENCES CITED

The following references are of record in the file of this patent:

UNITED STATES PATENTS

| Number | Name | Date |
|---|---|---|
| 2,316,624 | Romanelli | Apr. 13, 1943 |
| 2,376,209 | Turin | May 15, 1945 |
| 2,415,776 | Walton | Feb. 11, 1947 |
| 2,435,895 | McIlvaine | Feb. 10, 1948 |

FOREIGN PATENTS

| Number | Country | Date |
|---|---|---|
| 551,989 | Great Britain | Mar. 18, 1943 |

OTHER REFERENCES

"Measuring and recording Dewpoint temperatures of Industrial Gases," by Nelson Gildersleve, "Instrumentation," vol. 3, No. 1, 1947.